July 3, 1956

G. A. KEYSER 2,752,935

POULTRY WATERING DEVICE

Filed Dec. 3, 1954

INVENTOR.
GEORGE A. KEYSER
BY
Lyon & Lyon
ATTORNEYS

United States Patent Office 2,752,935
Patented July 3, 1956

2,752,935
POULTRY WATERING DEVICE
George A. Keyser, Ramona, Calif.
Application December 3, 1954, Serial No. 472,926
3 Claims. (Cl. 137—408)

My invention relates to poultry watering devices, and included in the objects of my invention are:

First, to provide a poultry watering device which is particularly adapted to supply water for a small number of chickens, usually four to eight, placed individually or in pairs in laying pens sharing a common corner, the watering device being placed in such common corner so that a portion of the water supply is accessible to each pen.

Second, to provide a poultry watering device which accurately controls the liquid level in the supply pan or cup, so that the liquid level may be maintained at a sufficiently low level that the chickens' beaks may touch the bottom of the pan without submerging their nostrils, so that the chickens tend to pick the pan clean of food and minimize contamination.

Third, to provide a poultry watering device which is readily adjusted to operate over a wide range of water supply pressures.

Fourth, to provide a poultry watering device wherein the valve element is located well within the device and wherein an elongated valve stem is disposed in the outflow channel and agitated by flow of even small quantities of water, thus tending to maintain the valve head and seat free of particles which might prevent full closure of the valve.

Figure 1:
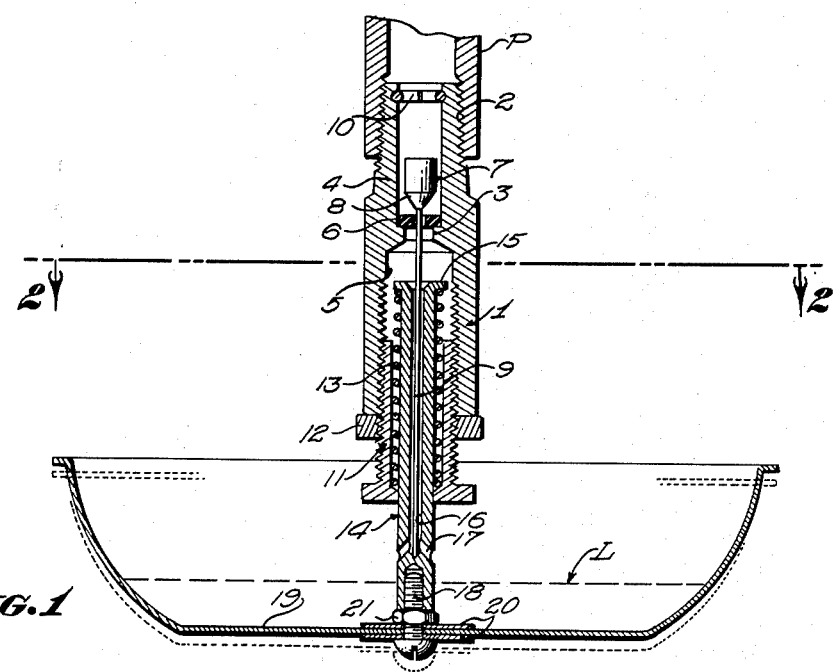
Figure 2:
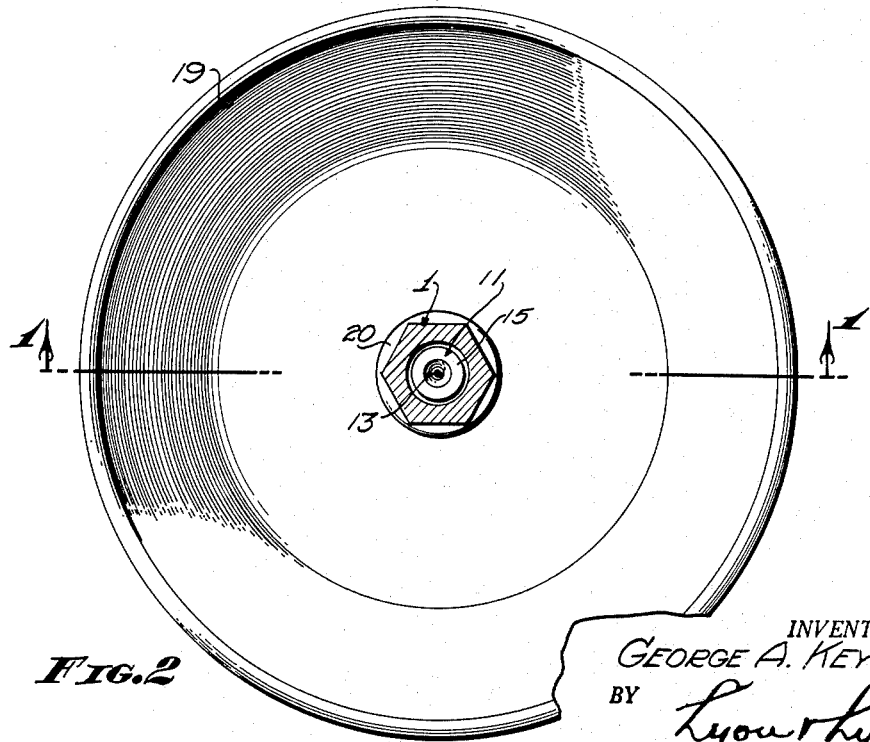

With the above and other objects in view, as may appear hereinafter, reference is directed to the accompanying drawings in which:

Figure 1 is a longitudinal sectional view of my poultry watering device, taken through 1—1 of Figure 2; and Figure 2 is a transverse sectional view thereof, taken through 2—2 of Figure 1.

My poultry watering device includes a tubular body 1 externally screw-threaded at its upper end, as indicated by 2, for connection to a water supply pipe P. Within the body 1 there is formed a constriction 3 which divides the bore of the body into an upper valve chamber 4 and a lower discharge chamber 5. The upper extremity of the constriction 3 is counterbored to receive a valve seat 6 in the form of a washer of rubber or plastic material.

A valve member 7 is provided which includes a valve head 8 disposed in the valve chamber 4 and a valve stem 9 of small diameter which extends downwardly through the valve seat 6. A split ring 10 retains the valve head 8 in the valve chamber 4.

The discharge chamber 5 of the valve body 1 is internally screw-threaded to receive an externally screw-threaded sleeve 11. The sleeve may be adjusted longitudinally relative to the valve body and secured by means of a lock nut 12.

The sleeve 11 is adapted to receive a compression spring 13 and to slidably receive within the spring 13 a tubular discharge stem 14. The upper end of the discharge stem 14 is provided with a flange 15 which rests on the upper end of the spring 13. The discharge stem is provided with a small bore 16 extending axially to a point below the sleeve 11 and is there intersected by laterally and downwardly directed outlet ports 17. The lower extremity of the sleeve 11 is provided with an internally screw-threaded socket which receives a screw 18.

A water pan 19 in the form of a shallow dish is provided with a central opening through which the screw 18 extends. The screw is sealed relative to the pan by means of washers 20 and a nut 21. The water pan is thus supported from the lower end of the discharge stem 14 by means of the screw 18.

Operation of my poultry watering device is as follows:

The valve stem 9 extends loosely into the bore 16 of the discharge stem 14 and is adapted to bottom therein when the discharge stem 14 is raised so as to raise the valve head 8 from the valve seat 6.

The screw-threaded sleeve 11 is adjusted longitudinally until the weight of the discharge stem 14, water pan 19, and a predetermined quantity of water therein is just sufficient to depress the discharge stem 14 so that the valve stem 9 clears the lower end of the bore 16, permitting the valve to close. As the water is depleted the discharge stem 14 rises, lifting the valve stem 9 and opening the valve.

It will be observed that the valve member 7 and valve seat 6 are relatively small in effective area, so that the effect of water pressure in the supply pipe is minimized. However, substantial change in the water pressure does in fact change the force required to open the valve.

By adjusting the screw-threaded sleeve 11, the force exerted by the spring 13 may be adjusted so as to compensate for the pressure in the supply pipe. Thus it is possible to adjust the watering device for water pressures of only a few pounds or for relatively high pressure of 80 to 100 lbs.

Furthermore, only a normal amount of water need be carried in the water pan. For example, it may be maintained relatively close to the liquid level L, indicated in Fig. 1, or at a level low enough that the water will not enter the chickens' nostrils when their beaks touch the bottom of the watering pan.

This is of primary importance, for one of the defects in the maintenance of a water supply for chickens is the necessity of frequent cleaning of the water pans of food which tends to ferment therein and is then injurious to the chickens. By reason of the fact that the water level may be maintained low, the chickens will peck any food lying in the water pan and tend to keep the water pan much cleaner than would otherwise be the case.

It will be observed that although a careful balance may be readily maintained the water pan is capable of withstanding considerable rough usage, not only by the chickens but also by the maintenance crew in the course of cleaning and servicing the watering device.

It will be also observed that the valve is a substantial distance within the valve body and quite inaccessible unless the device is dismantled, so that there is a minimum opportunity of damage to the valve or valve seat.

Having fully described my invention, it is to be understood that I do not wish to be limited to the details herein set forth, but my invention is of the full scope of the appended claims.

I claim:

1. A poultry watering device, comprising: a tubular valve body adapted for connection at its upper end to a water supply pipe, and defining an upper valve chamber, a lower internally screw-threaded discharge chamber, and a valve seat between said chambers; a valve element in said valve chamber engageable with said valve seat and having a stem depending into said discharge chamber; a discharge stem having a bore terminating in lateral discharge ports; a sleeve slidably receiving said discharge stem and screw-threaded into said discharge chamber; a spring disposed between said sleeve and discharge stem tending to urge said discharge stem upwardly, the bore of said discharge stem adapted to receive the valve stem and raise said valve element from said valve seat when said valve stem bottoms in said discharge stem bore; and a watering pan secured to the lower end of said discharge stem to collect water discharged through said ports, the weight of water in said watering pan tending to depress said spring and discharge stem to close said valve element when a predetermined quantity of water is collected by said watering pan.

2. A poultry watering device, comprising: a tubular valve body adapted for connection at its upper end to a water supply pipe, and defining an upper valve chamber, a lower internally screw-threaded discharge chamber, and a valve seat between said chambers; a valve element in said valve chamber engageable with said valve seat and having a stem depending into said discharge chamber; a watering pan; an upstanding discharge stem secured thereto and defining a flow passage discharging into said watering pan; an externally screw-threaded sleeve adjustably mounted in said discharge chamber; yieldable means supporting and tending to raise said discharge stem in said sleeve, the flow passage of said discharge stem adapted to receive the stem of said valve element, to open said valve element when said discharge stem is raised, said yieldable means responsive to a predetermined quantity of water in said watering pan to lower said discharge stem and permit closing of said valve element.

3. A poultry watering device, comprising: a valve body adapted for connection at its upper end to a water supply pipe and having a valve seat therein; a sleeve fitted in the lower end of said valve body; a discharge stem slidable in said sleeve and having an axial flow passage therein and lateral ports; a spring yieldably supporting said discharge stem in said sleeve and tending to urge said discharge stem upwardly; a valve element above said valve seat and adapted to be urged toward a closed position by the pressure of water in said supply pipe; a valve stem depending from said valve element in the flow passage of said discharge stem and engaged, on upward movement of said discharge stem, to open said valve element; and a watering pan supported by said discharge tube and tending to lower said discharge tube to permit closing of said valve element when a predetermined quantity of water is collected in said watering pan.

References Cited in the file of this patent

UNITED STATES PATENTS 2,501,727     Kubista _____ Mar. 28, 1950